US 6,734,145 B2

(12) United States Patent
Rayborn

(10) Patent No.: US 6,734,145 B2
(45) Date of Patent: *May 11, 2004

(54) DRILLING FLUID ADDITIVE SYSTEM CONTAINING TALC & CARRIER

(75) Inventor: Jerry Rayborn, Franklinton, LA (US)

(73) Assignee: Alpine Mud Products Corporation, Belle Chasse, LA (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/196,265

(22) Filed: Jul. 17, 2002

(65) Prior Publication Data

US 2003/0176291 A1 Sep. 18, 2003

Related U.S. Application Data

(63) Continuation-in-part of application No. 10/090,201, filed on Mar. 5, 2002.

(51) Int. Cl.[7] ................................................. C09K 7/02
(52) U.S. Cl. ...................... 507/140; 507/103; 507/125; 507/136; 507/139; 507/107; 507/108
(58) Field of Search ................................. 507/140, 103, 507/125, 136, 139, 107, 108

(56) References Cited

U.S. PATENT DOCUMENTS

| 5,114,597 | A | * | 5/1992 | Rayborn et al. | ............ 507/126 |
| 5,531,274 | A | * | 7/1996 | Bienvenu, Jr. | ............ 166/280 |
| 5,942,467 | A | * | 8/1999 | Rayborn et al. | ............ 507/106 |
| 6,605,570 | B2 | * | 8/2003 | Miller et al. | ............ 507/211 |

* cited by examiner

Primary Examiner—Philip C. Tucker
(74) Attorney, Agent, or Firm—Dan DeLa Rosa, Esq.

(57) ABSTRACT

A drilling fluid additive system is provided wherein the system is manufactured by a method comprised of admixing colloidal solids such as talc with a carrier such as oils or glycols to create a suspended mixture to thereby allow the colloidal solids to be pre-wet or coated with the carrier; and then admixing copolymer beads to the suspended mixture to allow the beads to be pre-wet or coated with the carrier; and then adding the suspended mixture with a mixture comprised of hydrophilic clay, a pH controller, a fluid loss controller, and a dispersant.

41 Claims, 2 Drawing Sheets

DRILLING FLUID ADDITIVE SYSTEM CONTAINING TALC & CARRIER

RELATED APPLICATION

This application is a continuation-in-part application of U.S. application Ser. No. 10/090,201 pending, entitled Water-Based Drilling Fluid Additive Containing Talc & Carrier which was filed on Mar. 5, 2002.

BACKGROUND OF THE INVENTION

1. Field of the Invention

This invention relates to a drilling fluid additive system manufactured by a process comprising: admixing colloidal solids with a carrier to create a suspended mixture to thereby allow the solids to be pre-wet or coat with the carrier; admixing copolymer beads to the suspended mixture to thereby allow the beads to be pre-wet or coat with the carrier and to form a drilling fluid additive mixture; and admixing hydrophilic clay, a pH controller, a fluid loss controller, and a dispersant to the drilling fluid additive mixture. More specifically, the present invention relates to an improved method of enhancing the surface of a cake wall of a well bore by adding a drilling fluid system to the well bore manufactured by the following method: admixing talc with an oil or glycol and then admixing polymer beads to the mixture, and subsequently adding this mixture with a mixture of hydrophilic clay, a pH controller, a fluid loss controller, and a dispersant.

2. Description of the Related Art

New technology in drilling for oil and gas now includes horizontal drilling. The horizontal drilling concept exposes more surface area of the producing zone than the conventional vertical drilling operations. For example, if a producing zone is fifty feet in thickness and a vertical well is drilled through such a zone, then only fifty feet of the producing zone will be exposed for production. In contrast, a horizontally drilled well may penetrate the producing sand or zone by one thousand feet or more. The amount or volume of oil or gas production is directly proportional to the horizontal penetration in feet into the producing sand or zone. In horizontal or directional drilling where the drill pipe must bend in order to achieve the desired penetration into the producing zone, friction becomes a major problem. The primary source of friction is directly related to the adhesion of the drilling assembly to the wall cake which lines the drilled well bore. The capillary attractive forces generated by the adhesion of the drilling assembly to the wall cake are directly proportional to the amount or footage of the drilling assembly exposed to the surface of the wall cake.

In horizontal or directional wells, many methods have been used in order to reduce friction between the drilling assembly and the wall cake. One such method would be to add a liquid lubricant to the drilling fluid in order to reduce the coefficient of friction of the drilling fluid. These liquid lubricants include oils, such as hydrocarbon based oils, vegetable oils, glycols, etc. These liquid lubricants will usually reduce the coefficient of friction of the drilling fluid resulting in a reduction of friction between the drilling assembly and the wall cake of the well bore.

When the liquid lubricant is added to the drilling fluid, it has several options as to how it will react. One option is that the lubricant remains isolated and does not mix well with the drilling fluid. A second option is that the lubricant emulsifies with the water in the drilling fluid to form an oil-in-water emulsion. Still another option is the oil attaching itself to the commercial solids in the drilling fluid or to the drilled cuttings or drilled solids. In certain circumstances, some of the liquid lubricant might be deposited or smeared onto the wall cake of the well bore. The ideal scenario would be to have all of the liquid lubricant deposited on the wall cake.

Those experienced in drilling fluid engineering know that a thin, tough, pliable, and lubricious wall cake is most desirable. The integrity of a wall cake is determined by several factors. The thickness of a wall cake is directly proportional to the amount of liquid leaving the drilling fluid, and being forced into the wall of the well bore by hydrostatic pressure. The thickness of the wall cake is also determined by the type and particle size of the solids in the drilling fluid. Particle Size Distribution, or PSD is important to the wall cake integrity. Experts in drilling fluids also know that materials such as bentonite clay, starches, lignites and polymers are all used to build acceptable wall cakes. It is known in the prior art that various food grade vegetable oils are acceptable lubricants when used alone in water-based drilling fluids. It is also known in the prior art that round co-polymer beads when used alone in water-based drilling fluids function as a good friction reducer. However, much more is required to improve the wall cake integrity and lubricity of most well bores. In addition, there is no technology or process in the prior art that improves the lubrication or friction reducing capacity of the copolymer beads.

Furthermore, the solids control equipment used on the drilling rigs today is far superior as to what was used 15 to 20 years ago. In the past, drilling rig shale shakers would probably be limited to screen sizes of about 20–40 mesh on the shakers. These coarser mesh screens would allow pieces of shale and the drilled formation to pass through the shaker screens back into the drilling fluid and then recirculated back down the well bore. As these larger than colloidal size particles make their way back up the well bore to the surface, the action of the drilling assembly rotating within the well bore forces these larger particles into the surface of the well bore. For example: a 20×20 mesh shaker screen would allow a drilled cutting sized at 863 microns or 0.0340 inches to pass through it and then the cutting would be returned to the well bore and some of these 863 micron cuttings would eventually be embedded into the wall cake. This would give the wall cake surface a texture resembling that of coarse sandpaper. These larger particles would allow the drilling fluid to channel and pass between the drilling assembly and the wall cake thereby reducing the negative effect of the capillary attractive forces generated by the close contact of the drilling assembly with the wall cake. The instances of the drilling assembly becoming stuck to the wall cake when less efficient solids control equipment, such as shale shakers, was used much less than it is today. The more efficient shale shakers today are a great improvement for the drilling fluids but the instances of sticking the drilling assembly are higher. The reason for a higher rate of stuck drilling assemblies today could be blamed on cleaning the drilling fluid to efficiently. Today many drilling rigs utilize cascading shale shakers, which eventually pass the drilling fluid through 200 mesh or 74 micron screens. This is very positive for controlling the percentage of drilled solids in the drilling fluid but it also affects the texture or surface of the wall cake. The finer the solids on the surface of the wall cake are, the greater the capillary attractive forces will be between the drilling assembly and the wall cake.

The present invention provides a method of enhancing the surface of the wall cake. In order to accomplish this, the invention provides a method, which adds something to improve the texture of the surface of the wall cake, and then adds something to prevent large amounts of water from leaving the drilling fluid then passing through the wall cake into the formation. The present invention also provides a carrier for the colloidal solids and beads, which also acts as a lubricant for the drilling fluid. The present invention further provides a process that reduces the effect of capillary attractive forces between the drilling assembly and the wall cake, thereby reducing the tendency of the drilling assembly to become stuck. In high angle directional wells where down hole motors are used to rotate the drill bit and the drill pipe remains stationary, it is important that the drilling assembly can slide as the drilling bit cuts more holes. The present invention improves the ability to slide while drilling as stated above.

SUMMARY OF THE INVENTION

In one embodiment, the present invention relates to a drilling fluid additive system manufactured by a method comprising of: admixing colloidal solids with a carrier to create a suspended mixture to thereby allow the solids to be pre-wet with the carrier; admixing copolymer beads to the suspended mixture to thereby allow the beads to be pre-wet with the carrier and to form a drilling fluid additive mixture, the solids and the beads having an affinity for oils, esters, glycols and olefins; and admixing hydrophilic clay, a pH controller, a fluid loss controller, and a dispersant to the drilling fluid additive mixture.

For purposes of this invention, the carrier applies to both the liquid and solid (powder) forms of carrier and the term pre-wet or coat shall apply to dry and wet coatings and/or treatments of the solid with the carrier. In one embodiment, the talc is pre-wet with a liquid carrier. In another embodiment, the talc is coated with a solid (powder) carrier.

In another embodiment, the beads are comprised of styrene and divinylbenzene. In still another embodiment, the beads have a specific gravity at about 1.0 and a size from about 100 microns to about 900 microns. In yet another embodiment, the solids are comprised of talc. In still yet another embodiment, the solids have a size range from about 2 microns to about 10 microns.

In a further embodiment, the carrier may consist essentially of oils, vegetable oils, mineral oils, paraffin oils, animal oils, esters, glycols and olefins. In yet a further embodiment, the carrier functions as a lubricant. In still a further embodiment, the carrier comprises soybean oil.

In yet still a further embodiment, the carrier of the present invention comprises polypropylene glycol. In another further embodiment, the carrier comprises from about 5% to about 98% of the additive mixture, the solids comprises from about 2% to about 50% of the additive mixture, and the beads comprises from about 2% to about 50% of the additive mixture.

In yet another further embodiment, the system further comprises a weighting agent, the weighting agent consisting essentially of barium sulfate (barite), calcium carbonate, hematite, and salts. In still yet another further embodiment, the system further comprises a surfactant, the surfactant being a nonionic surfactant. In another embodiment, the surfactant comprises a polyethoxylated glycol.

In still another embodiment, the pH controller may consist essentially of caustic acid, lime, potassium hydroxide and sodium hydroxide. In yet another embodiment, the fluid loss controller may consist essentially of lignites, polyacrylamide and graphite uintaite (Gilsonite) glycol dispersions. In still yet another embodiment, the hydrophilic clay may consist essentially of bentonite, kaolin clay and viscosifiers. In a further embodiment, the dispersant may consist essentially of lignite and lignosulfonate. In yet a further embodiment, the system further comprises a chemical inhibitor, the chemical inhibitor consisting essentially of gypsum, lime, potassium chloride, potassium hydroxide, magnesium sulfate and calcium sulfate.

In another embodiment, the present invention relates to a method of manufacturing a drilling fluid additive system, the method comprising: shearing colloidal solids with a carrier to create a suspended mixture to thereby allow the solids to be pre-wet with the carrier and to form a drilling fluid additive mixture; and admixing hydrophilic clay, a pH controller, a fluid loss controller, and a dispersant to the drilling fluid additive mixture. In one embodiment, the solid may be admixed with the carrier and in another embodiment, the solid may be sheared with the carrier. In one embodiment, the solid may be admixed with the carrier and in another embodiment, the solid may be sheared with the carrier.

In yet another embodiment, the method further comprises admixing polymeric beads to said drilling fluid additive mixture after pre-wetting said solids with said carrier, said solids and said beads having an affinity for cellulose, oils, esters, glycols and olefins. In still another embodiment, the beads have a specific gravity at about 1.0 and a size from about 100 microns to about 900 microns; the beads are comprised of styrene and divinylbenzene. In still yet another embodiment, the solids have a size range from about 2 microns to about 10 microns; the solids are comprised of talc. In a further embodiment, the carrier consists essentially of oils, vegetable oils, mineral oils, paraffin oils, animal oils, esters, glycols and olefins.

In yet a further embodiment, the carrier comprises polypropylene glycol. In still a further embodiment, the carrier comprises soybean oil. In another further embodiment, the solids comprises from about 2% to about 50% of the additive mixture; the carrier comprises from about 5% to about 98% of the additive mixture; and the beads comprises from about 2% to about 50% of the additive mixture.

In yet another further embodiment, the pH controller may consist essentially of caustic acid, lime, potassium hydroxide and sodium hydroxide. In still another further embodiment, the fluid loss controller may consist essentially of lignites, polyacrylamide and graphite uintaite (Gilsonite") glycol dispersions. In still yet another further embodiment, the hydrophilic clay may consist essentially of bentonite, kaolin clay and viscosifiers. In another embodiment, the dispersant may consist essentially of lignite and lignosulfonate.

In yet another embodiment, the method further comprises adding a weighting agent; the weighting agent consisting essentially of barium sulfate (barite), calcium carbonate, hematite, and salts. In still another embodiment, the method further comprises adding a surfactant; the surfactant being a nonionic surfactant. In still yet another embodiment, the method further comprises adding a chemical inhibitor; the chemical inhibitor consisting essentially of gypsum, lime, potassium chloride, potassium hydroxide, magnesium sulfate and calcium sulfate.

In a further embodiment, the present invention relates to a method of enhancing the surface of a wall cake of a well bore; the method comprising: shearing colloidal solids with a carrier to create a suspended mixture to thereby allow the solids to be pre-wet or coated with the carrier; admixing copolymer beads to the suspended mixture thereby allowing the beads to be pre-wet or coated with the carrier; adding the suspended mixture to a water-based drilling fluid to form a system, the drilling fluid comprising hydrophilic clay, a pH controller, a fluid loss controller, and a dispersant; and adding the system to a well bore.

In yet a further embodiment, the beads having an affinity for oils, esters, glycols, cellulose and olefins; the beads have a specific gravity at about 1.0 and a size from about 100 microns to about 900 microns; the beads are comprised of styrene and divinylbenzene. In still a further embodiment, the solids having an affinity for oils, esters, glycols and olefins; the solids have a size range from about 2 microns to about 10 microns; the solids are comprised of talc. In still yet a further embodiment, the carrier may consists essentially of oils, vegetable oils, mineral oils, paraffin oils, animal oils, esters, glycols and olefins; the carrier may function as a lubricant. In a further embodiment, the drilling fluid further comprises a surfactant; the surfactant comprises a polyethoxylated glycol. In another further embodiment, the drilling fluid further comprises a weighting agent; the weighting agent consisting essentially of barium sulfate (barite), calcium carbonate, hematite, and salts. In another embodiment, the solids comprises from about 2% to about 50% of the additive mixture; the carrier comprises from about 5% to about 98% of the additive mixture; and the beads comprises from about 2% to about 50% of the additive mixture.

In another embodiment, the present invention relates to a water-based drilling fluid additive comprising talc and at least one carrier wherein the carrier may be oils, esters, glycols, cellulose and olefins or combinations thereof. In still another embodiment, the talc is coated or treated with the carrier converting the surface of the talc to a carrier treated or coated surface.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The present invention provides a process that includes selecting specific materials having different particle sizes and then pre-wetting each particle with an environmentally acceptable lubricant prior to adding these particles to the water-based drilling fluid. This process produces much improved wall cake integrity and lubricity. The present invention also teaches that food grade vegetable oils are excellent carriers for various solid friction reducers and wall cake enhancers. The present invention has also discovered that pre-wetting the round copolymer beads with a food grade vegetable oil prior to adding the copolymer beads to the drilling fluid improves the lubrication or friction reducing capacity of the copolymer beads. The other criterion is that the products and its components have to be environmentally friendly.

Figure 1:
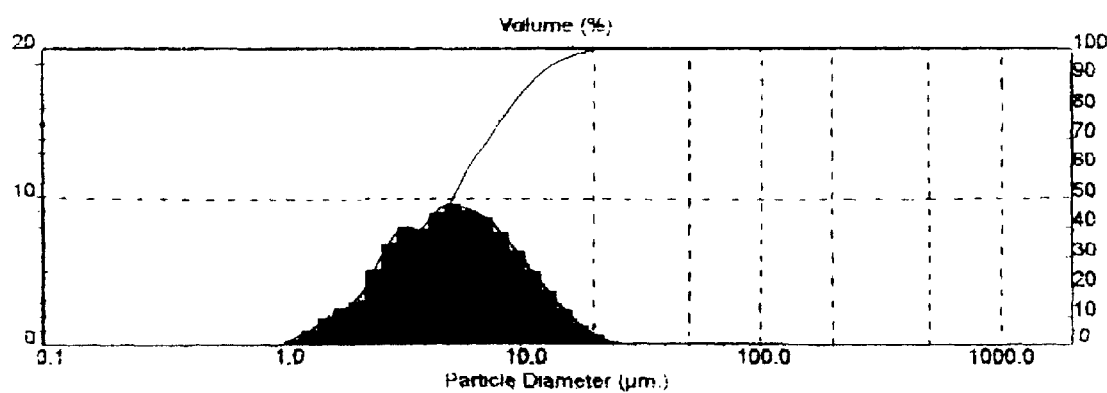
FIG. 1 is a graph representing talc particle size versus volume in percent.

In accordance with the manufacturing process of the present invention, talc powder is sheared with an environmentally friendly oil or liquid lubricant, which repels water. The shearing should continue until each organophilic or hydrophobic talc particle is coated with the oil or liquid lubricant. In one embodiment, the talc powder most preferred would be one with a particle size from about 1 micron to about 20 microns and one which would produce a bell shaped curve having the majority of the particles in the 2 micron to 8 micron size, as shown in FIG. 1.

The polymeric beads of the present invention should be a solid particle, preferably round and have a specific gravity close to 1.0 and have a size from about 100 microns to about 900 microns. The beads must also have an affinity for oils, esters, olefins and glycols, etc. It was determined that a copolymer bead manufactured by Dow Chemical comprised of styrene and divinylbenzene would be acceptable.

The colloidal solids of the present invention should have a size range of 2–10 microns since tests have proven that this particle size will bridge sandstone having a permeability of 200 md. The solids must also have an affinity for oils, esters, olefins and glycols, etc. In one embodiment, the solids are talc. The talc of the present invention also functions as an excellent suspending agent in both oils and glycols. FIG. 1 depicts a graphical representation of the particle size of talc and Table 1, as set forth below, represents the result statistics for the particle size for talc:

TABLE 1

Particle Size Statistics For Talc

| Dist. Type: Vol<br>Mean Diameters:<br>D [4, 3] = 6.30 um | Concentration = 0.0136% Vol<br>D (v, 0.1) = 2.40 um<br>D [3, 2] = 4.37 um | Density = 2.650 g/cub. cm<br>D (v, 0.5) = 5.28 um<br>Span = 1.760E+00 | Spec. SA = 0.5176 sq. m/g<br>D (v, 0.9) = 11.68 um<br>Uniformity = 5.495E−01 |
|---|---|---|---|
| Size Low (um) | In % | Size High (um) | Under % |
| 0.31 | 0.00 | 0.36 | 0.00 |
| 0.36 | 0.00 | 0.42 | 0.00 |
| 0.42 | 0.00 | 0.49 | 0.00 |
| 0.49 | 0.00 | 0.58 | 0.00 |
| 0.58 | 0.00 | 0.67 | 0.00 |
| 0.67 | 0.00 | 0.78 | 0.00 |
| 0.78 | 0.00 | 0.91 | 0.00 |
| 0.91 | 0.02 | 1.06 | 0.02 |
| 1.06 | 0.32 | 1.24 | 0.35 |
| 1.24 | 0.94 | 1.44 | 1.29 |
| 1.44 | 1.83 | 1.68 | 3.12 |
| 1.68 | 2.51 | 1.95 | 5.62 |
| 1.95 | 2.94 | 2.28 | 8.57 |
| 2.28 | 5.05 | 2.65 | 13.62 |
| 2.65 | 6.89 | 3.09 | 20.51 |
| 3.09 | 7.96 | 3.60 | 28.47 |
| 3.60 | 7.81 | 4.19 | 36.29 |
| 4.19 | 8.89 | 4.88 | 45.18 |
| 4.88 | 9.49 | 5.69 | 54.67 |
| 5.69 | 9.05 | 6.63 | 63.72 |
| 6.63 | 8.60 | 7.72 | 72.33 |
| 7.72 | 7.61 | 9.00 | 79.94 |
| 9.00 | 6.35 | 10.48 | 86.29 |
| 10.48 | 5.02 | 12.21 | 91.31 |
| 12.21 | 3.70 | 14.22 | 95.01 |
| 14.22 | 2.47 | 16.57 | 98.95 |
| 16.57 | 1.46 | 19.31 | 99.68 |
| 19.31 | 0.73 | 22.49 | 100.00 |
| 22.49 | 0.27 | 26.20 | 100.00 |
| 26.20 | 0.05 | 30.53 | 100.00 |
| 30.53 | 0.00 | 35.56 | 100.00 |
| 35.56 | 0.00 | 41.43 | 100.00 |
| 41.43 | 0.00 | 48.27 | 100.00 |
| 48.27 | 0.00 | 56.23 | 100.00 |
| 56.23 | 0.00 | 65.51 | 100.00 |
| 65.51 | 0.00 | 76.32 | 100.00 |
| 76.32 | 0.00 | 88.91 | 100.00 |
| 88.91 | 0.00 | 103.58 | 100.00 |
| 103.58 | 0.00 | 120.67 | 100.00 |
| 120.67 | 0.00 | 140.58 | 100.00 |
| 140.58 | 0.00 | 163.77 | 100.00 |
| 163.77 | 0.00 | 190.80 | 100.00 |
| 190.80 | 0.00 | 222.28 | 100.00 |
| 222.28 | 0.00 | 258.95 | 100.00 |
| 258.95 | 0.00 | 301.68 | 100.00 |

The carrier of the present invention may be selected from different oils, olefins, esters, fatty acids, cellulose and glycols. In another embodiment, the carrier may be synthetic oils, diesel oils, rice oils, cottonseed oils, corn oils, safalour oils, linseed oils, coconut oils, vegetable oils, mineral oils, and paraffin oils. In still another embodiment, the carrier is soybean oil. The oil coating on the hydrophobic talc particles enhances the plugging action of the talc across or into micro fractures in sands, shale and other substances down hole.

In a further embodiment, the present invention relates to a method of manufacturing a drilling fluid additive whereby talc and copolymer beads are added to soybean oil and mixed or sheared until each particle of talc and copolymer bead is oil wet. A first sample was produced by addition of 350 grams of soybean oil with 5 grams of talc and 100 grams of polymer beads to the oil, and then mixing all the components for 10 minutes using a waring blender. After blending, the mixture was placed in a beaker for observation. The mixture appeared homogeneous and initially resembled buttermilk. After 5 minutes, the beads began to settle. After one hour, all the beads settled to the bottom of the beaker and some of the oil began separating from the mixture and clear oil was present at the upper portion of the beaker. After sitting overnight (10 hours later), the upper portion of the beaker was clear oil and the bottom portion was the talc, beads and oil. Pouring the clear oil off exposed that the beads had settled and packed tightly preventing the beads from pouring out of the beaker. This sample could not be placed in a drum or tank for shipping because the beads would settle and plug the drum or tank.

Figure 2:
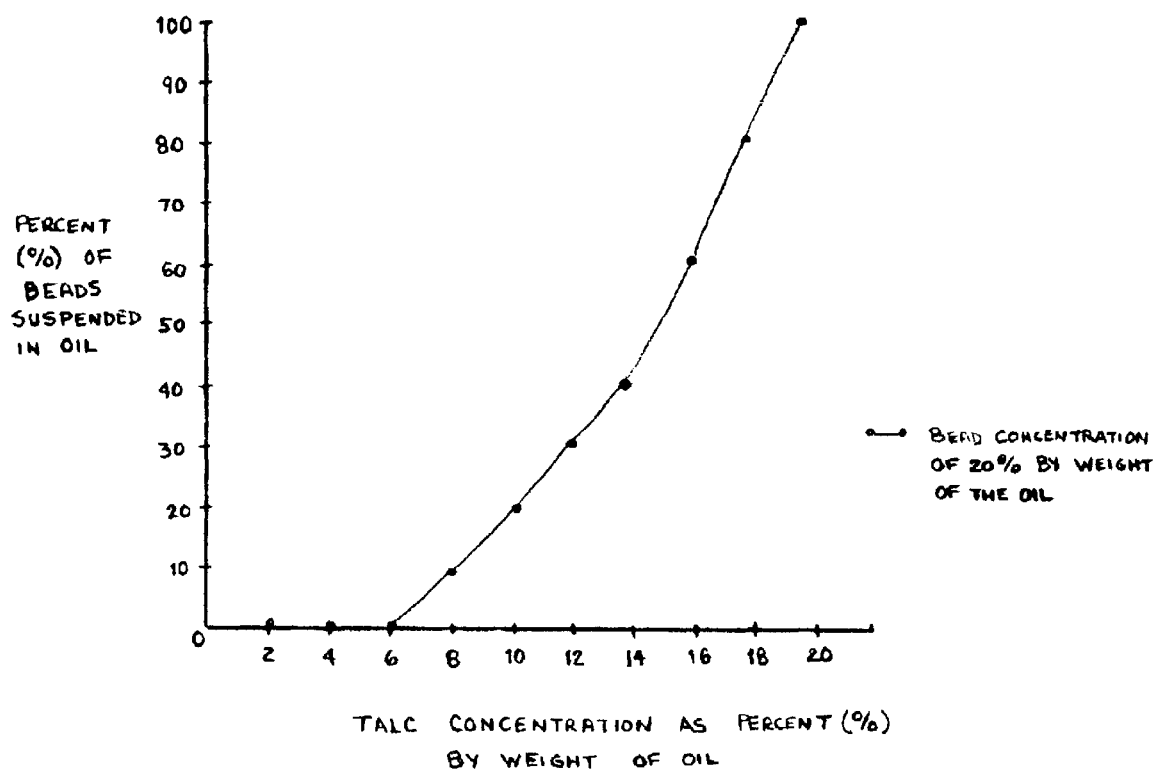
FIG. 2 is a graph representing the percent of beads suspended in oil versus the talc concentration as percent by weight of oil.

A second sample was produced by adding talc to the oil and eliminating the beads initially. It was discovered that the oil accepted approximately 40% by weight of talc. After sitting overnight, there was no separation between the talc and the oil. At that point, small additions of beads were added to the above mixture. The addition of 2% by weight of beads to the talc/oil mixture was encouraging. The beads settled slightly but did not pack off. As the concentration of the beads was increased in the mixture, it was discovered that the beads remained suspended in the mixture. FIG. 2 depicts graphical representations of the talc concentration as percent (%) by weight of oil versus the percent (%) of beads suspended in oil. FIG. 2 illustrates that as the talc concentration as a percent (%) by weight of the oil increases, the suspension qualities of the liquid oil increases. As FIG. 2 illustrates, the talc concentration of 20 percent by weight of the liquid oil suspends 100 percent of the copolymer beads.

The second sample was then heated to 150 degrees Fahrenheit for 24 hours and the copolymer beads remained suspended. The mixture was then cooled to 35 degrees Fahrenheit for 24 hours and the copolymer beads remained suspended. It was also discovered that the optimum concentration of the beads was from about 20 percent to about 30 percent by weight of the oil, and the concentration of the talc should be around 20 percent by weight of oil. Although this sample appears to be the best, the concentration may vary.

The specific examples throughout the specification will enable the present invention to be better understood. However, they are merely given by way of guidance and do not imply any limitations. Example 1 conducted tests on a 9.9 pounds per gallon (ppg) water-based drilling fluid and Example 2 conducted tests on a 16.9 pounds per gallon (ppg) water-based drilling fluid. Example 3 conducted tests on the reduction of capillary forces in both the 9.9 ppg drilling fluid of Example 1 and the 16.9 ppg drilling fluid of Example 2.

EXAMPLE 1

Test 1: Rheology & HPHT Results

In Example 1, a 9.9 pound per gallon water-based drilling fluid was tested for the (a) the compatibility of the drilling fluid-such as rheology; and the yield point and gels in particular; (b) the high pressure high temp fluid loss-HPHT; (c) the filter cake wt./gram; and (d) the filter cake thickness (in inches). Parameters were first tested on the base mud. By comparison, 2 percent (%) by volume of the oil, talc and the beads mixture was added to the base drilling fluid and mixed for 5 minutes on a Waring blender. In Test 1 & Table 2, the following rheology and HPHT results were noted:

TABLE 2

Rheology & HPHT Results

|  | BASE | BASE & 2% TALC MIXTURE | % REDUCTION |
|---|---|---|---|
| Density | 9.9 | | |
| PH Meter | 10.3 | | |
| 600 rpm | 19 | 22 | |
| 300 rpm | 11 | 13 | |
| 200 rpm | 8 | 10 | |
| 100 rpm | 5 | 6 | |
| 6 rpm | 2 | 1 | |
| 3 rpm | 2 | 1 | |
| PV @ 120 F. | 8 | 9 | |
| YP | 3 | 4 | |
| Gels 10 sec/10 min | 2/13 | 1/17 | |
| HPHT @ 200 Deg F./ml | 12.0 | 8.0 | 33% |
| Cake Wt./g | 5.9 | 5.4 | 8% |
| Cake Thickness/inch | 3/32 | 2/32 | 33% |
| MBT/pbb | 30 | | |
| Solid/Oil/Water | 10/00/90 | | |

The results of Example 1, Test 1 indicate the following: the talc, bead and oil mixture was very compatible with the mud rheology with only slight increases in yield point and gels. The HPHT fluid loss was reduced from 12.0 to 8.0; a 33% reduction, which is excellent. The cake in weight in grams was reduced from 5.9 grams to 5.4 grams, an 8% reduction. The cake thickness in inches was reduced from 3/32 to 2/32, a 33% reduction, which is also excellent.

EXAMPLE 1

Test 2: Dynamic Filtration

In Example 1, Test 2, the following dynamic filtration criteria were tested: (a) Fluid loss versus time; (b) Filter cake wt/gram; and (c) Filter cake thickness in inches. The dynamic filtration data of Example 1, Test 2 is set forth in Table 3 below:

TABLE 3

DYNAMIC FILTRATION
5 Darcy, 50 Micron Filter Media
200 Degrees F., 600 rpm @ 1000 PSI for 60 Minutes

|  | Fluid Loss (ml) | | |
|---|---|---|---|
| TIME (Minutes) | BASE | BASE & 2% TALC MIXTURE | % REDUCTION |
| Initial Spurt | 1.5 | trace | |
| 15 | 12.6 | 5.8 | |
| 30 | 17.0 | 10.0 | |
| 45 | 21.2 | 14.0 | |
| 60 | 24.0 | 16.8 | 30% |
| Cake Wt/g | 10.7 | 5.8 | 46% |
| Cake Thickness/Inch | 3/32 | 2/32 | 33% |

The results of Example 1, Test 2 are as follows: after 60 minutes, the dynamic fluid loss was reduced from 24.0 ml to 16.8 ml, a 30% reduction, which is excellent. The cake weight in grams was reduced from 10.7 grams to 5.8 grams, a 46% reduction, which is also excellent. The cake thickness was reduced from 3/32 to 2/32, a 33% reduction, which is excellent.

EXAMPLE 1

Test 3: Lubricity Test

Table 4 below shows the test results of the lubricity of the additive as torque is applied.

TABLE 4

LUBRICITY TEST @ 60 rpms
Co-efficient of Friction of Water (0.33–0.36) = 0.33;
i.e. reading at 150 inch pounds is 33

|  | Lubricity Reading (electric current required to sustain 60 rpm at applied torque) | | |
|---|---|---|---|
| Applied Torque/Inch Pounds | BASE | BASE & 2% TALC MIXTURE | % REDUCTION |
| 100 | 10 | 11 | |
| 150 | 16 | 16 | |
| 200 | 21 | 21 | |
| 300 | 31 | 28 | |
| 400 | 44 | 37 | |
| 500 | 66 | 50 | |
| 600 | 80 | 65 | 19% |

The lubricity results of Example 1, Test 3 indicate an improvement in lubrication was about 19% at the 600 reading on the lubricity tester.

EXAMPLE 1

Test 4: Texture of Dynamic Filter Cake Surfaces

The texture of the filter cake surfaces and the surfaces of the base mud were also tested. The results were as follows: the texture of the surface of the base mud was extremely smooth and shinny. The texture of the Dynamic Filter Cake Surface of the base mud treated with 2% by volume of the talc, bead and oil mixture was shinny and the copolymer beads could be seen impregnated in the cake as well as protruding on the surface of the cake.

EXAMPLE 2
Test 1: Rheology & HPHT Results

In Example 2, a 16.9 pound per gallon water-based drilling fluid was tested for the (a) the compatibility of the drilling fluid-such as rheology; and the yield point and gels in particular; (b) the high pressure high temp fluid loss-HPHT; (c) the filter cake wt./gram; and (d) the filter cake thickness (in inches). Parameters were first tested on the base mud. By comparison, 2 percent (%) by volume of the oil, talc and the beads mixture was added to the base drilling fluid and mixed for 5 minutes on a Waring blender. In Example 2, Test 1, the following rheology and HPHT results were noted in Table 5 below:

TABLE 5

Rheology & HPHT Results

|  | BASE | BASE & 2% TALC MIXTURE | % REDUCTION |
|---|---|---|---|
| Density | 16.9 | | |
| PH Meter | 10.4 | | |
| 600 rpm | 53 | 56 | |
| 300 rpm | 30 | 32 | |
| 200 rpm | 22 | 25 | |
| 100 rpm | 13 | 15 | |
| 6 rpm | 2 | 3 | |
| 3 rpm | 1 | 2 | |
| PV @ 120 F. | 23 | 24 | |
| YP | 7 | 8 | |
| Gels 10 sec/10 min | 4/19 | 5/27 | |
| HPHT @ 300 Deg F./ml | 15.0 | 13.2 | 12% |
| Cake Wt./g | 27.2 | 18.7 | 31% |
| Cake Thickness/inch | 6/32 | 4/32 | 33% |

The results of Example 2, Test 1 indicate the following: in Test 2, Table 5, the talc, beads and oil mixture was very compatible with the mud rheology with little change points and gel. The HPHT fluid loss was reduced from 15.0 to 13.2, a 12% reduction, which is somewhat less than expected. The cake weight in grams was reduced from 27.2 grams to 18.7 grams, a 31% reduction, which is a very good result. The cake thickness was reduced from 6/32 to 4/32, a 33% reduction.

EXAMPLE 2
Test 2: Dynamic Filtration

In Example 2, Test 2, the following dynamic filtration criteria were tested: (a) Fluid loss versus time; (b) Filter cake wt/gram; and (c) Filter cake thickness in inches. The dynamic filtration data of Example 2, Test 2 is set forth in Table 6 below:

TABLE 6

DYNAMIC FILTRATION
10 Darcy, 35 Micron Filter Media
300 Degrees F., 600 rpm @ 1000 PSI for 60 Minutes

| | | Fluid Loss (ml) | |
|---|---|---|---|
| TIME (Minutes) | BASE | BASE & 2% TALC MIXTURE | % REDUCTION |
| Initial Spurt | 1.0 | 0.5 | |
| 15 | 25.2 | 17.6 | |
| 30 | 38.0 | 25.0 | |
| 45 | 46.0 | 31.4 | |
| 60 | 53.2 | 36.0 | 32% |
| Cake Wt/g | 91 | 62 | 32% |
| Cake Thickness/Inch | 18/32 | 12/32 | 33% |

The results of Example 2, Test 2, Table 6 are as follows: after 60 minutes, the dynamic fluid loss was reduced from 24.0 ml to 16.8 ml, a 32% reduction, which is an excellent result. The cake weight in grams was reduced from 91 grams to 62 grams, a 32% reduction, which is a very good result. The filter cake was reduced from 18/32 to 12/32, a 33% reduction, which is also an excellent result.

EXAMPLE 2
Test 3: Lubricity Test

Table 7 below shows the test results of the lubricity of the additive as torque is applied.

TABLE 7

LUBRICITY TEST @ 60 rpms
Co-efficient of Friction of Water (0.33–0.36) = 0.33;
i.e. reading at 150 inch pounds is 33

| | Lubricity Reading (electric current required to sustain 60 rpm at applied torque) | | |
|---|---|---|---|
| Applied Torque/Inch Pounds | BASE | BASE & 2% TALC MIXTURE | % REDUCTION |
| 100 | 14 | 9 | |
| 150 | 23 | 12 | |
| 200 | 30 | 15 | |
| 300 | 46 | 20 | |
| 400 | 60 | 23 | |
| 500 | 76 | 25 | |
| 600 | 92 | 28 | 70% |

The lubricity results of Example 2, Test 3 indicate an improvement in lubrication was about 70% at the 600 reading on the lubricity tester, which is an excellent result.

EXAMPLE 2
Test 4: Texture of Dynamic Filter Cake Surfaces

The texture of the filter cake surfaces and the surfaces of the base mud were also tested. The results were as follows: the texture of the surface of the base 16.9 ppg mud was smooth and shinny. The texture of the Dynamic Filter Cake surface of the base mud treated with 2% by volume of the talc, bead and oil mixture was shinny and the copolymer beads could be seen impregnated in the cake as well as protruding on the surface of the cake.

EXAMPLE 3
Reduction in Capillary Attractive Forces of Examples 1 & 2

In Example 3, the (dynamic) filter cake of the base mud was placed on a flat surface and a piece of glass_inch thick and four inches square was placed flat on the surface of the base mud filter cake and allowed to sit for thirty minutes. An attempt was then made to lift the glass from the filter cake. As the glass plate was lifted, the filter cake followed and it was as though the filter cake was glued to the glass.

The (dynamic) filter cake of the base mud to which 2% of the additive of the present invention was added was placed on the flat surface and the same process discussed above was duplicated. It was found that the piece of glass easily separated from the filter cake surface, which was treated with the additive of the present invention. The results show that the additive mixture of the present invention definitely reduced, if not, eliminated the capillary attractive forces of the wall cake.

Since the above tests were conducted in open air on the counter top, it was determined that the same tests should be conducted while totally submerged in the drilling fluid. In running the same tests with the filter cake and the 4 inch piece of glass completely submerged in the drilling fluid, it would be concluded that no air would be present in the filter cake or the glass surface and such a test would resemble a wellbore filled with drilling fluid. This test results were as follows: the glass plate stuck more firmly to the submerged water-based mud wall cakes than it did in open air; and the glass plate would not stick to the wall cakes of the water-based muds, which were treated with the 2% by volume of the drilling fluid additive of the present invention.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A drilling fluid additive system manufactured by a method comprising of:
    admixing talc with a carrier to create a suspended mixture to thereby allow said talc to be pre-wet with said carrier, said carrier being selected from a group consisting of oils, glycols, esters, olefins and mixtures thereof;
    admixing copolymer beads to said suspended mixture to thereby allow said beads to be pre-wet with said carrier and to form a drilling fluid additive mixture; and
    admixing hydrophilic clay, a pH controller, a fluid loss controller, and a dispersant to said drilling fluid additive mixture.

2. The drilling fluid additive system of claim 1 wherein said beads are comprised of styrene and divinylbenzene.

3. The drilling fluid additive system of claim 2 wherein said beads have a specific gravity at about 1.0 and a size from about 100 microns to about 900 microns.

4. The drilling fluid additive system of claim 1 wherein said talc has a size range from about 2 microns to about 10 microns.

5. The drilling fluid additive system of claim 1 wherein said carrier functions as a lubricant.

6. The drilling fluid additive system of claim 1 wherein said carrier comprises soybean oil.

7. The drilling fluid additive system of claim 1 wherein said carrier comprises polypropylene glycol.

8. The drilling fluid additive system of claim 1 wherein said carrier comprises from about 5% to about 96% of said additive mixture, said solids comprise from about 2% to about 50% of said additive mixture, and said beads comprise from about 2% to about 50% of said additive mixture.

9. The drilling fluid additive system of claim 1 further comprising a weighting agent, said weighting agent consisting essentially of barium sulfate (barite), calcium carbonate, hematite, and salts.

10. The drilling fluid additive system of claim 1 further comprising a surfactant, said surfactant being a nonionic surfactant.

11. The drilling fluid additive system of claim 10 wherein said surfactant comprises a polyethoxylated glycol.

12. The drilling fluid additive system of claim 1 wherein said pH controller consist essentially of caustic acid, lime, potassium hydroxide and sodium hydroxide.

13. The drilling fluid additive system of claim 1 wherein said fluid loss controller consist essentially of lignites, polyacrylamide and graphite uintaite glycol dispersions.

14. The drilling fluid additive system of claim 1 wherein said hydrophilic clay consist essentially of bentonite, kaolin clay and viscosifiers.

15. The drilling fluid additive system of claim 1 wherein said dispersant consist essentially of lignite and lignosulfonate.

16. The drilling fluid additive system of claim 1 further comprising a chemical inhibitor, said chemical inhibitor consisting essentially of gypsum, lime, potassium chloride, potassium hydroxide, magnesium sulfate and calcium sulfate.

17. A method of manufacturing a drilling fluid additive system, said method comprising:
    shearing talc with a carrier to create a suspended mixture to thereby allow said solids talc to be pre-wet with said carrier, said carrier being selected from a group consisting of oils, glycols, esters, olefins and mixtures thereof and then admixing copolymer beads and to thereby form a drilling fluid additive mixture; and
    admixing hydrophilic clay, a pH controller, a fluid loss controller, and a dispersant to said drilling fluid additive mixture.

18. The method of claim 17 wherein said beads have a specific gravity at about 1.0 and a size from about 100 microns to about 900 microns, said beads are comprised of styrene and divinylbenzene.

19. The method of claim 17 wherein said talc has a size range from about 2 microns to about 10 microns.

20. The method of claim 17 wherein said carrier comprises polypropylene glycol.

21. The method of claim 17 wherein said carrier comprises soybean oil.

22. The method of claim 17 wherein said talc comprises from about 2% to about 50% of said additive mixture, said carrier comprises from about 5% to about 96% of said additive mixture, and said beads comprise from about 2% to about 500% of said additive mixture.

23. The method of claim 17 wherein said pH controller consist essentially of caustic acid, lime, potassium hydroxide and sodium hydroxide.

24. The method of claim 17 wherein said fluid loss controller consist essentially of lignites, polyacrylamide and graphite uintaite glycol dispersions.

25. The method of claim 17 wherein said hydrophilic clay consist essentially of bentonite, kaolin clay and viscosifiers.

26. The method of claim 17 wherein said dispersant consist essentially of lignite and lignosulfonate.

27. The method of claim 17 further comprising adding a weighting agent, said weighting agent consisting essentially of barium sulfate (barite), calcium carbonate, hematite, and salts.

28. The method of claim 17 further comprising adding a surfactant, said surfactant being a nonionic surfactant.

29. The method of claim 17 further comprising adding a chemical inhibitor, said chemical inhibitor consisting essentially of gypsum, lime, potassium chloride, potassium hydroxide, magnesium sulfate and calcium sulfate.

30. A method of enhancing the surface of a wall cake of a well bore, said method comprising:
    shearing talc with a carrier to create a suspended mixture to thereby allow said talc to be pre-wet with said carrier, said carrier being selected from a group consisting of oils, glycols, esters, olefins and mixtures thereof;
    admixing copolymer beads to said suspended mixture thereby allowing said beads to be pre-wet with said carrier;
    adding said suspended mixture to a water-based drilling fluid to form a system, said drilling fluid comprising hydrophilic clay, a pH controller, a fluid loss controller, and a dispersant; and
    adding said system to a well bore.

31. The method of claim 30 wherein said beads have a specific gravity at about 1.0 and a size from about 100 microns to about 900 microns, said beads are comprised of styrene and divinylbenzene.

32. The method of claim 30 wherein said talc has a size range from about 2 microns to about 10 microns.

33. The method of claim 30 wherein said drilling fluid further comprises a surfactant, said surfactant comprises a polyethoxylated glycol.

34. The method of claim 30 wherein said drilling fluid further comprises a weighting agent, said weighting agent consisting essentially of barium sulfate (barite), calcium carbonate, hematite, and salts.

35. The method of claim 30 wherein said comprises from about 2% to about 50% of said additive mixture, said carrier comprises from about 5% to about 96% of said additive mixture, and said beads comprise from about 2% to about 50% of said additive mixture.

36. A drilling fluid additive system comprising: talc, copolymer beads and at least one carrier, said carrier being selected from a group consisting of oils, glycols, esters, olefins and mixtures thereof, and hydrophilic clay, a pH controller, a fluid loss controller, and at least one dispersant.

37. The system of claim 36 wherein said beads has a specific gravity at from about 1.0 to about 1.5 and a size from about 40 microns to about 1500 microns, said beads are comprised of a material selected from a group consisting of styrene, divinylbenzene and mixtures thereof.

38. The system of claim 36 wherein said pH controller is selected from a group consisting of caustic acid, lime, potassium hydroxide and sodium hydroxide.

39. The system of claim 36 wherein said fluid loss controller is selected from a group consisting of lignites, polyacrylamide and graphite uintaite glycol dispersions.

40. The system of claim 36 wherein said hydrophilic clay is selected from a group consisting of bentonite, kaolin clay and viscosifiers.

41. The system of claim 36 wherein said dispersant is selected from a group consisting of lignite and lignosulfonate.

* * * * *